United States Patent
Kumar et al.

(10) Patent No.: US 7,908,035 B2
(45) Date of Patent: Mar. 15, 2011

(54) SYSTEM AND METHOD FOR WIND FORMULARY

(75) Inventors: Vivek Kumar, Bihar (IN); Hemanth Kumar A, Karnataka (IN); Chery Jose, Kerala (IN); Sandeep Kumar Vidiyala, Andhra Pradesh (IN)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 12/550,790

(22) Filed: Aug. 31, 2009

(65) Prior Publication Data

US 2010/0138059 A1    Jun. 3, 2010

(51) Int. Cl.
| | |
|---|---|
| G06F 17/40 | (2006.01) |
| G06F 11/00 | (2006.01) |
| G05D 3/12 | (2006.01) |
| G05D 5/00 | (2006.01) |
| G05D 9/00 | (2006.01) |
| G05D 11/00 | (2006.01) |
| G05D 17/00 | (2006.01) |
| F03D 9/00 | (2006.01) |
| H02P 9/04 | (2006.01) |

(52) U.S. Cl. ............ 700/286; 700/287; 290/44; 290/55; 702/187; 702/188

(58) Field of Classification Search .......... 700/286–287; 290/44, 55; 702/187–188; 340/3.1
See application file for complete search history.

(56) References Cited

U.S. PATENT DOCUMENTS

| | | | |
|---|---|---|---|
| 6,925,385 B2 | 8/2005 | Ghosh et al. | |
| 7,013,203 B2 | 3/2006 | Moore et al. | |
| 7,403,854 B1 * | 7/2008 | Hurley et al. | 702/3 |
| 7,523,001 B2 | 4/2009 | Morjaria et al. | |
| 2002/0029097 A1 * | 3/2002 | Pionzio et al. | 700/286 |
| 2005/0143957 A1 * | 6/2005 | Kauppila et al. | 702/187 |
| 2007/0063866 A1 | 3/2007 | Webb | |
| 2009/0102196 A1 * | 4/2009 | Altemark et al. | 290/44 |
| 2009/0132101 A1 | 5/2009 | Gizara et al. | |
| 2010/0100249 A1 * | 4/2010 | Molgaard | 700/289 |

* cited by examiner

*Primary Examiner* — Ronald D Hartman, Jr.
(74) *Attorney, Agent, or Firm* — James McGinness, Esq.; Armstrong Teasdale LLP

(57) ABSTRACT

A controller for use in monitoring at least one operating wind turbine is communicatively coupled to the at least one operating wind turbine, to a server sub-system, and to a user interface device. The controller is configured to receive operational data from the at least one operating wind turbine and select at least one formula based on the received operational data, wherein at least one of a predetermined formula is selected, a formula is selected via the user interface device, and a formula is selected via the server sub-system. The controller is further configured to determine at least one site level parameter using the at least one selected formula, and transmit at least one of operational data, the at least one selected formula, and the determined parameter to the server sub-system.

20 Claims, 4 Drawing Sheets

SYSTEM AND METHOD FOR WIND FORMULARY

BACKGROUND OF THE INVENTION

The field of the invention relates generally to wind turbines and, more specifically, to management systems used with wind turbines, including supervisory control and data acquisition (SCADA) systems.

Wind turbine generators use wind energy to generate electricity and are becoming increasingly more important in terms of a renewable source of generating electricity. A wind turbine farm, that includes multiple wind turbines, is often managed by a SCADA system that monitors data received from sensors coupled to the wind turbines. Known SCADA systems calculate various parameters, such as 'lost production,' 'site power,' 'site wind speed,' and 'site availability,' based on the sensor data and using algorithms programmed into the SCADA system. When an operator of the SCADA system wants to implement new formulas to calculate additional parameters, or wants to modify the formulas programmed into the SCADA system, generally new or replacement software must be installed while the SCADA system is in a non-operating mode. Moreover, if an operator wanted to apply new or modified formulas to only a specific wind turbine or group of wind turbines, updated software components often must be installed as well. Because the SCADA system is non-functional while being upgraded with new or replacement software that includes the new or modified formulas, the system is unable to perform its SCADA functions and the wind turbine farm may be susceptible to damage because of the lack of monitoring and control.

Accordingly, the ability to add or modify the SCADA system while the system is operating, without the need to update or replace the software could provide a competitive advantage over systems that do not include such capabilities.

BRIEF DESCRIPTION OF THE INVENTION

In one aspect, a controller for use in monitoring at least one operating wind turbine is communicatively coupled to the at least one operating wind turbine, to a server sub-system, and to a user interface device. The controller is configured to receive operational data from the at least one operating wind turbine and select at least one formula based on the received operational data, wherein at least one of a predetermined formula is selected, a formula is selected via the user interface device, and a formula is selected via the server sub-system. The controller is further configured to determine at least one site level parameter using the at least one selected formula, and transmit at least one of operational data, the at least one selected formula, and the determined parameter to the server sub-system.

In another aspect, a system for use in monitoring at least one operating wind turbine is communicatively coupled to the at least one operating wind turbine. The system includes a user interface device configured to receive input from a user and receive input for output to the user. The system also includes a server sub-system configured to respond to requests received from components of said system, and a controller communicatively coupled to the at least one operating wind turbine, the user interface device, and the server sub-system. The controller is configured to receive operational data from the at least one operating wind turbine and select at least one formula based on the received operational data, wherein at least one of a predetermined formula is selected, a formula is selected via said user interface device, and a formula is selected from said server sub-system. The controller is further configured to determine at least one site level parameter using the at least one selected formula, and to transmit the operational data, the at least one selected formula, and/or the determined parameter to the server sub-system.

In yet another aspect, a method of monitoring at least one operating wind turbine uses a system that is communicatively coupled to the at least one operating wind turbine, wherein the system includes a user interface device, a server sub-system, and a controller. The method includes receiving operational data from the at least one operating wind turbine, and selecting at least one formula based on the received operational data, wherein a predetermined formula is selected, a formula is selected via the user interface device, and/or a formula is selected via the server sub-system. The method further includes determining at least one site level parameter using the at least one selected formula, and storing the operational data, the at least one selected formula, and/or the determined parameter via the server sub-system.

DETAILED DESCRIPTION OF THE INVENTION

Figure 1:
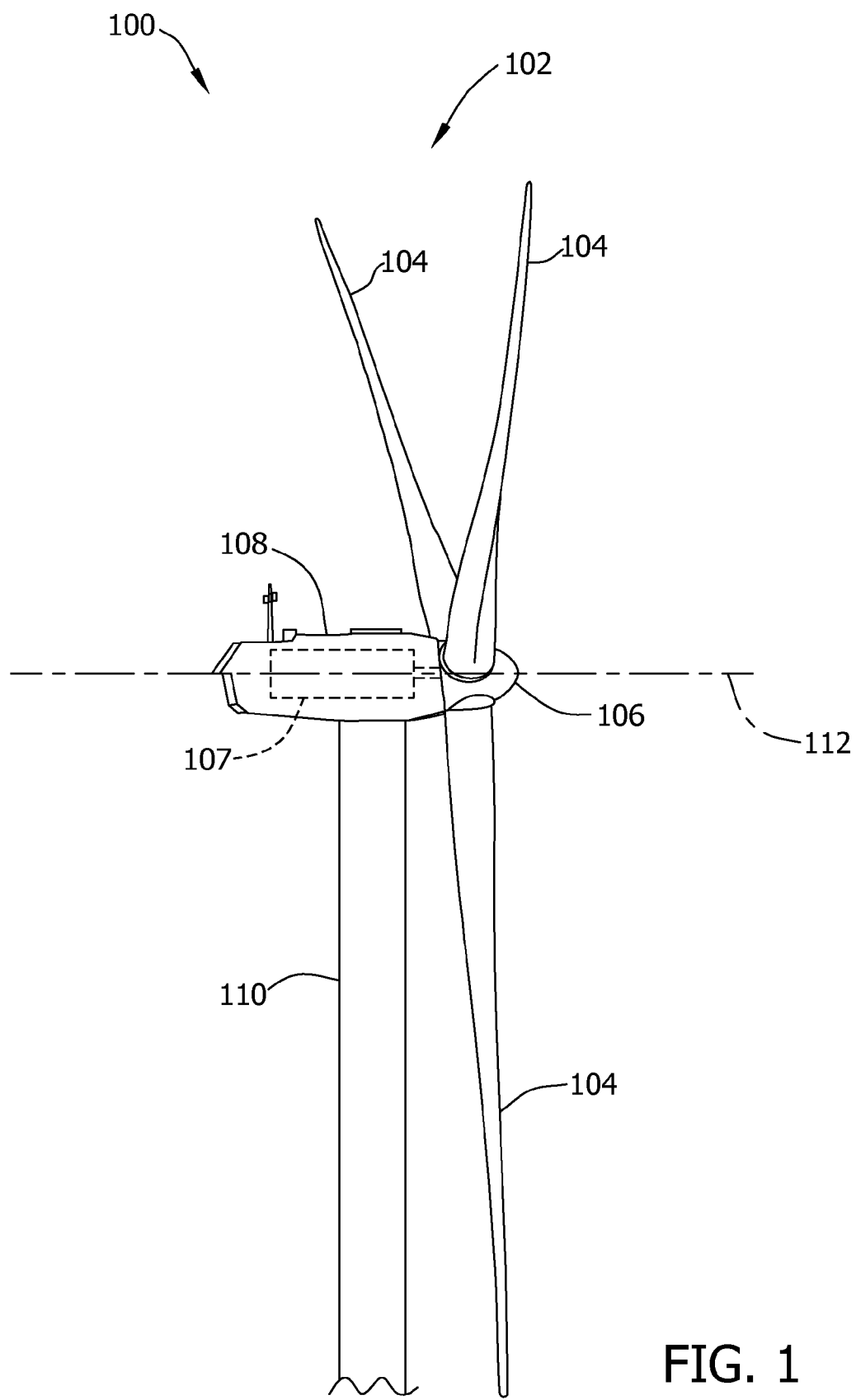
FIG. 1 is a side perspective view of an exemplary wind turbine.

FIG. 1 is a side perspective view of an exemplary wind turbine 100. In the exemplary embodiment, wind turbine 100 is a horizontal axis wind turbine generator. In an alternative embodiment, wind turbine 100 may be a vertical axis wind turbine generator. As used herein, the terms "wind turbine" and "wind turbine generator" are used interchangeably, and are representative of any device that converts wind energy to electrical energy and, more specifically, converts kinetic energy of wind into mechanical energy that generates electricity using a generator. Wind turbine 100 includes a rotor 102 that includes a plurality of rotor blades 104 coupled to a rotatable hub 106. Wind turbine 100 also includes a nacelle 107 that houses a generator 108 therein and that is coupled to rotatable hub 106. In the exemplary embodiment, rotor 102 includes three rotor blades 104. Alternatively, rotor 102 may include any suitable number of rotor blades 104 that enables wind turbine 100 to function as described herein. In the exemplary embodiment, generator 108 is coupled to a support tower 110 that supports wind turbine 100 during operation. In the exemplary embodiment, wind turbine 100 includes a gearbox (not shown) that is rotatably coupled to rotatable hub 106 and generator 108.

In the exemplary embodiment, wind forces act upon rotor blades 104 causing rotor 102 to rotate about an axis 112 of generator 108 of wind turbine 100 and to generate electrical power. In the exemplary embodiment, stresses created by the force of the wind upon rotor blades 104, hub 106, generator portion 108, and support tower 110, as well as operational parameters such as power output and temperature, are measured by sensors 204 (shown in FIG. 2) and/or determined by at least one programmable logic controller (PLC) 205, and the resulting measured and/or determined operational data, is transmitted to a wind formulary system 200 (shown in FIG. 2).

Technical effects of the methods, systems, and controller described herein include: at least one of receiving operational data and/or identifying information; selecting a formula; determining at least one site level parameter, storing operational data, identifying information, and/or determined parameters; and, outputting operation data and/or determined parameters.

Figure 2:
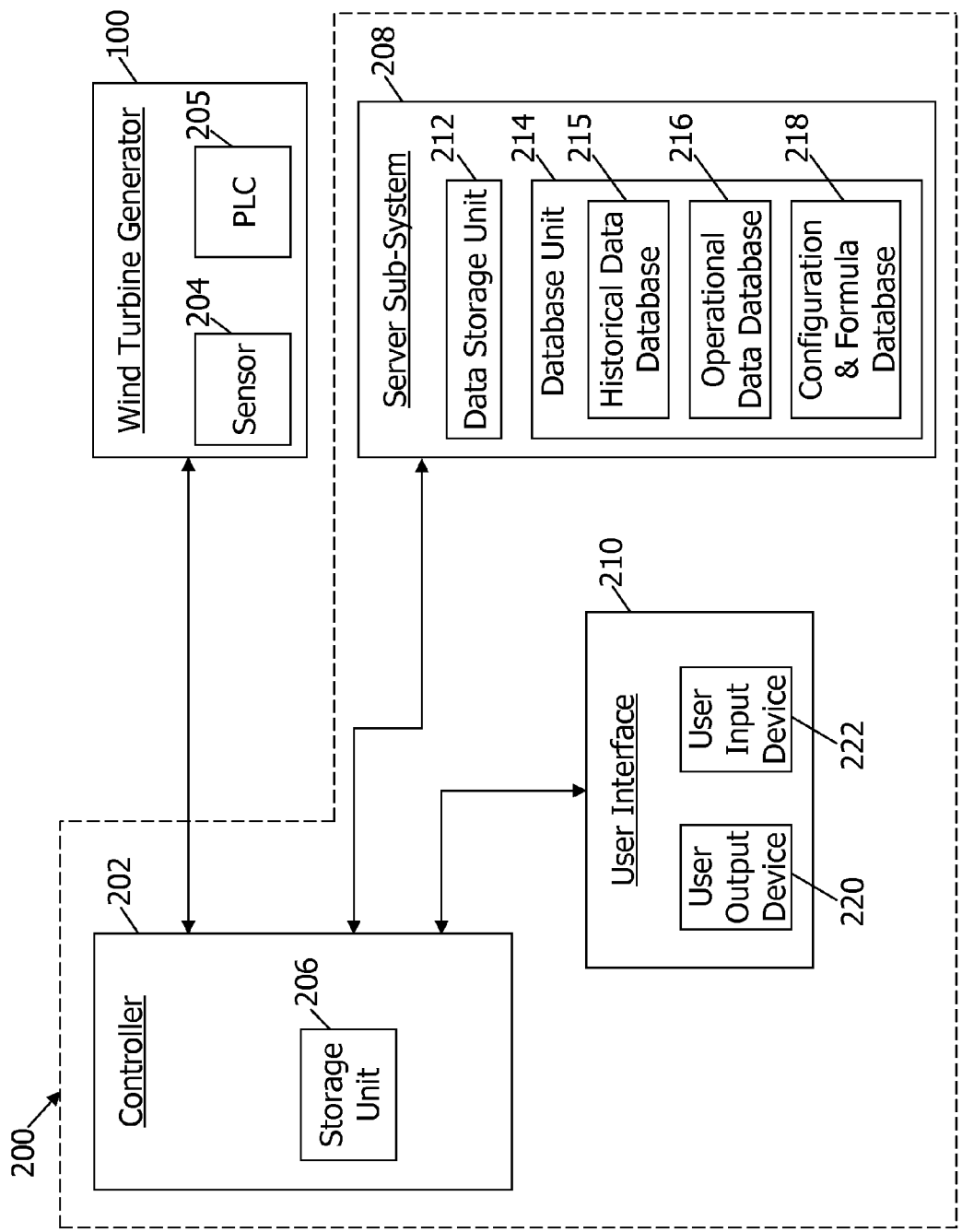
FIG. 2 is a block diagram illustrating an exemplary SCADA system that includes a controller for use in a wind formulary for monitoring an operating wind turbine.
Figure 3:
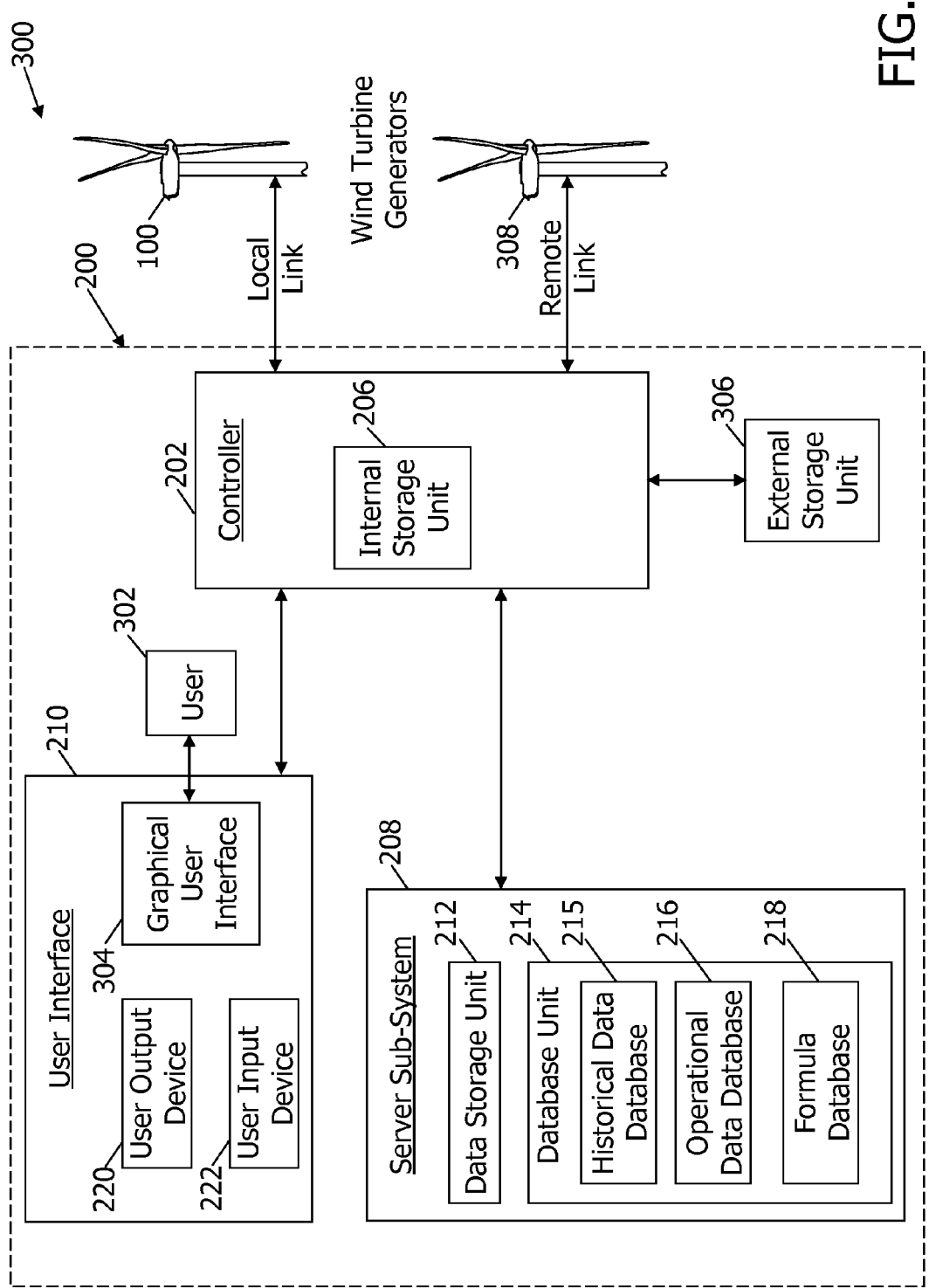
FIG. 3 is a block diagram illustrating an exemplary wind formulary system that may be used with the SCADA system shown in FIG. 2.
Figure 4:
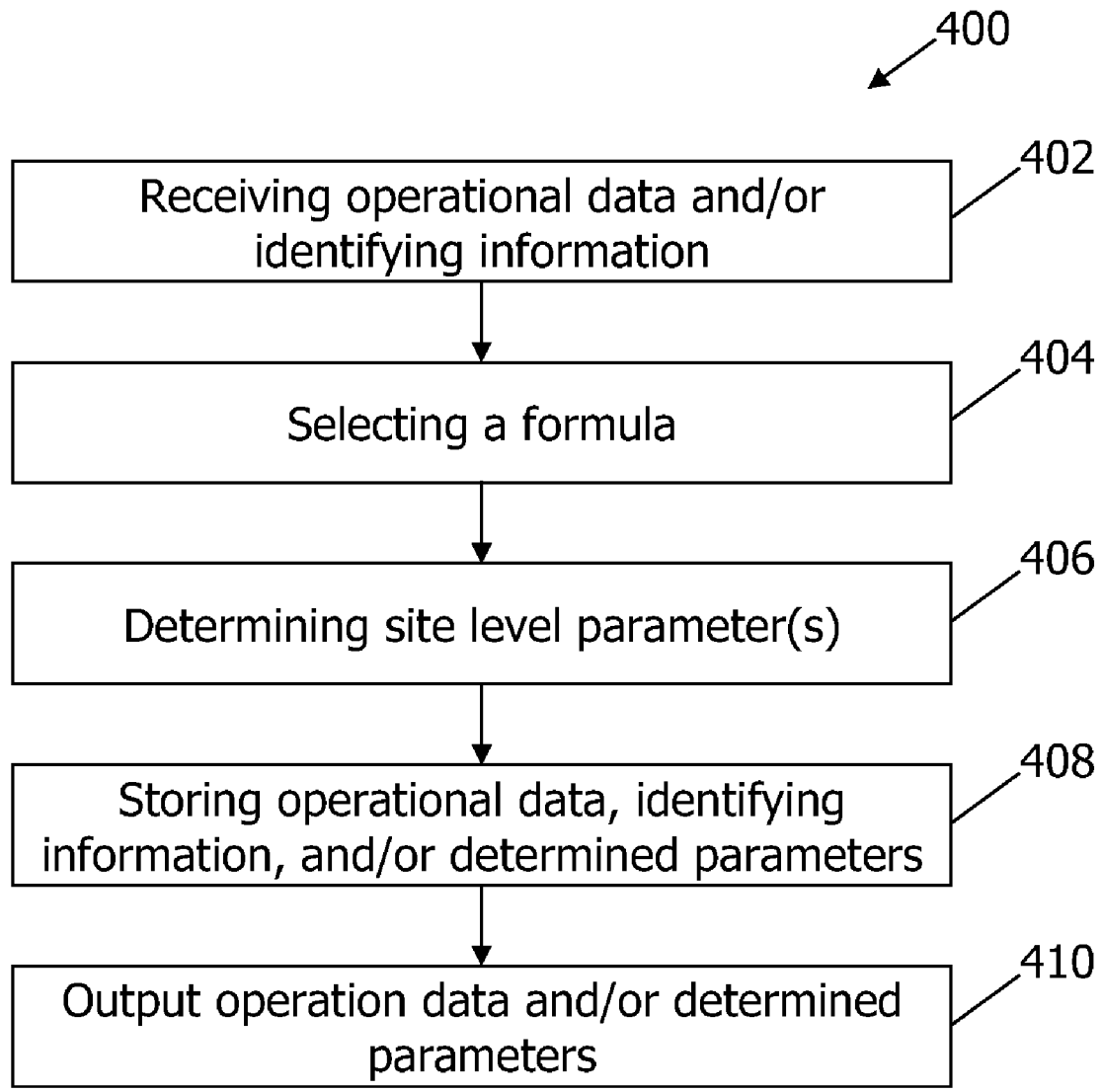
FIG. 4 is a flowchart of an exemplary method for use in monitoring an operating wind turbine.

FIGS. 2 and 3 are block diagrams illustrating an exemplary wind formulary system for use in monitoring an operating wind turbine 100 that includes identifying information to uniquely identify each operating wind turbine 100. FIG. 4 is a flowchart of an exemplary method 400 for monitoring an operating wind turbine 100.

In the exemplary embodiment, as shown in FIG. 2, wind formulary system 200 includes an exemplary controller 202 for use in monitoring an operating wind turbine 100 that includes identifying information to uniquely identify each operating wind turbine 100. In the exemplary embodiment, wind formulary system controller 202 includes a memory storage unit 206 that stores information and data used by controller 202 to operate, to retrieve, and/or to store operational data, identifying information, formulas, and/or site level parameters related to wind turbine 100. In various embodiments, memory storage unit 206 may include internal and/or external storage such as a hard drive, Read Only Memory (ROM), Random Access Memory (RAM), or any other suitable device known to those skilled in the art and guided by the teachings herein provided for performing the functions as described herein. As used herein, the term "controller" refers to a central processing unit, a microprocessor, a microcontroller, a microcomputer, a reduced instruction set circuit (RISC), an application specific integrated circuit (ASIC), a programmable logic controller, and any other circuit, combination of circuits, and devices known to one skilled in the art and guided by the teachings herein provided that is capable of being used as described herein.

In the exemplary embodiment, controller 202 is communicatively coupled to at least one operating wind turbine 100, to a server sub-system 208, and to a user interface device 210 that includes an input and an output. Moreover, in the exemplary embodiment, server sub-system 208 includes a data storage unit 212 and a database unit 214. In one embodiment, data storage unit 214 and database unit 214 receive data from controller 202, store the received data, receive requests for stored data, and/or retrieve stored data in response to the received requests. In an alternative embodiment, controller 202 is communicatively coupled to a SCADA system which acquires the operational data from the at least one operating wind turbine 100 and transmits the operational data to controller 202. Further, in the exemplary embodiment, database unit 214 stores and retrieves data based on requests received from controller 202 for data stored in one or more databases, such as in a historical data database 215, in an operational data database 216, and in a configuration and formula database 218 that includes configuration data and formulas for use with wind turbine 100. In the exemplary embodiment, user interface device 210 outputs and receives data via a user output device 220 and a user input device 222 respectively.

Moreover, in the exemplary embodiment, controller 202 receives operational data from operating wind turbine 100, wherein the operational data includes data from sensors 204 and/or PLC 205, such as measurements representative of the present operational status of various components of wind turbine 100. In other embodiments, the operational data may include, or be indicative of, temperature of various components of wind turbine 100, the power output of generator 108, the stresses or forces acting upon various components of wind turbine 100, and/or any other suitable measurements known to those skilled in the art and guided by the teachings herein. Moreover, in the exemplary embodiment, controller 202 selects at least one formula that is based on the received operational data. For example, controller 202 may select a predetermined formula from internal memory storage unit 206, may select a formula via user interface 210, and/or may select a formula via server sub-system 208. In one embodiment, the formula is selected from at least one formula previously received from a user via user input device 222. In an alternative embodiment, the formula may automatically be selected based on the received operational. For example, controller 202 may automatically select one formula for use during normal operations, and another formula for use during high temperature, high current, and/or high wind operations. Further, in this alternative embodiment, controller 202 may automatically select a formula based on either a predetermined trigger specified by an operator of controller 202, or controller 202 may automatically select a formula based on analysis of the received operational data and/or data contained in historical data database 215.

Upon selecting the formula, in the exemplary embodiment, controller 202 determines at least one site level parameter based on received operational data, and transmits the operational data and/or the formula to server sub-system 208. In an alternative embodiment, controller 202 outputs the operational data and/or the at least one site level parameter via user interface 210. In various alternative embodiments, user interface 210 outputs the operational data and/or the at least one site level parameter via user output device 220 using at least one of a visual display, a graphical user interface, a hardcopy device, and/or an audio device. Moreover, in the exemplary embodiment, the selected formula may be applied, in real-time, and used in determining the at least one site level parameter, thus enabling an operator of wind formulary system 200 to create and/or modify the formulas being used to monitor and/or analyze the operations of wind turbine 100 during operation of wind turbine 100 and in real-time.

In the exemplary embodiment, selecting a formula via server sub-system 208 includes transmitting operational data and/or wind turbine identifying information to server sub-system 208, transmitting a request to server sub-system 208 for at least one formula based on the operational data and/or the identifying information, and receiving at least one formula from server sub-system 208 in response to the request. Further, in addition to the operation of controller 202 using operational data, in the exemplary embodiment, controller 202 also transmits, to server sub-system, requests for historical data associated with wind turbine 100, and receives historical data in response to such requests. Furthermore, in the exemplary embodiment, controller 202 determines at least one site level parameter using the previously selected formula, based on the received historical data, transmits the determined site level parameter to server sub-system 208, and transmits the historical data, selected formula, and the determined site level parameter to a user using user output device 220 via user interface 210.

In the exemplary embodiment, as shown in FIG. 3, wind turbine management system 300 includes wind formulary system 200. Wind turbine management system 300 also includes user interface device 210 that receives input from a user 302 via a graphical user interface 304 and that receives input from other than user 302 via user input device 222. In an alternative embodiment, controller 202 is coupled to an external storage unit 306 for storage and retrieval of operational data, identifying information, and/or formulas similar to the function of internal storage unit 206. Moreover, in another alternative embodiment, wind turbine management system 300 enables user 302 to amass a plurality of formulas for use in monitoring operating wind turbine 100. User 302 may assign various formulas to each respective wind turbine 100 to provide additional and/or different monitoring formulas and/or capabilities for each respective wind turbine 100, as opposed to similar formulas across each respective wind turbine 100. Further, in another alternative embodiment, wind turbine management system 300 is communicatively coupled to an operating wind turbine 308 that is located remotely from wind turbine 100. In such an embodiment, the ability of wind turbine management system 300 to monitor remote operating wind turbine 308 in the same manner as system 300 monitors local operating wind turbine 100, enables an operator to monitor wind turbine farms, during operation, that are remotely located from wind turbine management system 300. Such a feature enables centralized monitoring of multiple disparate wind turbine farms, in such an embodiment.

In the exemplary embodiment, as shown in FIG. 4, method 400 includes receiving 402 operational data and/or identifying information from at least one operating wind turbine 100. It should be noted that the identifying information is used to uniquely identify each respective wind turbine 100. The method also includes selecting 404 at least one formula based on the received operational data and the identifying information, wherein the selecting 404 process includes selecting a predetermined formula, selecting a formula via user interface device 304, and/or selecting a formula via server sub-system 208. Upon selecting 404 the formula, in the exemplary embodiment, the method 400 also includes determining 406 at least one site level parameter using the selected formula, and based on the operational data and/or the identifying information, and storing 408 the operational data, the selected at least one formula, the identifying information, and/or the determined at least one site level parameter via server sub-system 208. Furthermore, in the exemplary embodiment, method 400 includes outputting 410 the operational data, the selected at least one formula, and/or the determined at least one site level parameter via user interface device 210.

In an alternative embodiment, to output 410 to a user, via user interface device 210, the operational data, the selected at least one formula, the identifying information, and/or the determined parameter is output 410 via a visual display, a graphical user interface, a hardcopy device, an audio device, and/or any suitable output device known to those skilled in the art and guided by the teachings herein provided for performing the functions as described herein. In addition, in another alternative embodiment, selecting 404 a formula includes selecting a formula received previously via user input device 222 of user interface device 210. Moreover, in yet another alternative embodiment, selecting 404 a formula includes selecting a formula that is based on historical data requested and received from server sub-system 208, wherein the historical data includes operational data previously received from wind turbine 100 and/or other similar devices.

Exemplary embodiments of a wind turbine formulary system and method for monitoring an operating wind turbine using the system are described above in detail. The system, as described herein, may be used to create, modify, and/or apply, the formulas used to monitor wind turbines in real-time while the wind turbine is operating, rather than requiring the monitoring system to be shutdown, reinstalled, or restarted during such a formula change/update process. Moreover, the system provides methods to create and/or modify a set of formulas that can be applied to historical data, i.e. previously collected and stored data, in order to generate data intelligence reports from an operational and revenue point of view. Further, the formulas can be used to perform calculations on operational data received from individual wind turbines as well as wind farms that include multiple wind turbines. Such a system enables live real-time results of calculations using the formulas to be available to other systems and provides a method to save the calculated data as historical data and for further analysis to ease the operational variability in the power production from wind turbines and/or wind farms. Further, the system, as described herein, may be used to monitor one or more operating wind turbines used to drive mechanical loads as opposed to generating electricity, and thus are not limited to practice with only the methods and systems as described herein. Rather, the exemplary embodiment can be implemented and utilized in connection with many wind turbine applications. Furthermore, the wind formulary system, as described herein, may be operated independently of, or in cooperation with, a SCADA system.

It should be noted that various modifications and change can be made thereto without departing from the broader spirit and scope of the invention. The specification and drawings are, accordingly, to be regarded in an illustrative rather than a restrictive sense.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences form the literal language of the claims.

What is claimed is:

1. A controller for use in monitoring at least one operating wind turbine, said controller communicatively coupled to the at least one operating wind turbine, and to a server sub-system, said controller configured to:
   receive operational data from the at least one operating wind turbine;
   select a formula based on the received operational data;
   determine at least one site level parameter using the selected formula; and,
   transmit at least one of operational data, the selected formula, and the determined parameter to the server subsystem.

2. A controller in accordance with claim 1, wherein said controller is further configured to output one or more of the operational data, the selected formula, and the determined parameter to a user via a user interface device.

3. A controller in accordance with claim 2, wherein a user interface device communicatively coupled to said controller outputs one or more of operational data, the selected formula, and the determined parameter to a user via at least one of a visual display, a graphical user interface, a hardcopy device, and an audio device.

4. A controller in accordance with claim 1, wherein selecting a formula further comprises automatically selecting the formula based on at least one of the received operational data and historical data.

5. A controller in accordance with claim 1, further comprising:
transmitting one or more of operational data and identifying information of the at least one operating wind turbine to the server sub-system;
transmitting a request for the selected formula; and,
receiving at least one formula via the server sub-system responsive to the request.

6. A controller in accordance with claim 1, wherein said controller is further configured to:
transmit a request for historical data associated with the at least one operating wind turbine to the server sub-system;
receive historical data via the server sub-system responsive to the request;
determine at least one site level parameter using the at least one selected formula based on the historical data;
transmit the determined parameter to the server sub-system; and,
output one or more of historical data, the selected formula, and the determined parameter to a user interface device communicatively coupled to said controller.

7. A system for use in monitoring at least one operating wind turbine, said system communicatively coupled to the at least one operating wind turbine and comprising:
a user interface device configured to receive input from a user and receive input for output to the user;
a server sub-system configured to respond to requests received from components of said system; and,
a controller communicatively coupled to the at least one operating wind turbine, said user interface device, and said server sub-system, said controller configured to:
receive operational data from the at least one operating wind turbine;
select a formula based on the received operational data;
determine at least one site level parameter using the selected formula; and,
transmit at least one of operational data, the selected formula, and the determined parameter to the server sub-system.

8. A system in accordance with claim 7, wherein said controller is further configured to output one or more of the operational data, the selected formula, and the determined parameter to the user via said user interface device.

9. A system in accordance with claim 8, wherein said user interface device outputs one or more of operational data, the selected formula, and the determined parameter to the user via at least one of a visual display, a graphical user interface, a hardcopy device, and an audio device.

10. A system in accordance with claim 7, wherein said controller is further configured to select automatically the formula based on at least one of the received operational data and historical data.

11. A system in accordance with claim 7, wherein said controller is further configured to:
transmit one or more of operational data and identifying information of the at least one operating wind turbine to said server sub-system;
transmit a request for the selected formula; and,
receive at least one formula from said server sub-system responsive to the request.

12. A system in accordance with claim 7, wherein said server sub-system further comprises a database server configured to store and retrieve one or more of historical data corresponding to the at least one operating wind turbine, and the selected formula, in response to requests from components of said system.

13. A system in accordance with claim 12, wherein said controller is further configured to:
transmit a request for the historical data associated with the at least one operating wind turbine to said server sub-system;
receive historical data from said server sub-system, responsive to the request;
determine at least one site level parameter using the selected formula based on the received historical data;
transmit the determined parameter to said server sub-system; and,
output one or more of historical data, the selected formula, and the determined at least one site level parameter to said user interface device.

14. A system in accordance with claim 7, wherein the selected formula comprises at least one set of an associated plurality of formulas.

15. A method of monitoring at least one operating wind turbine using a system communicatively coupled to the at least one operating wind turbine, the system comprising a server sub-system, and a controller, said method comprising:
receiving at the controller operational data from the at least one operating wind turbine;
selecting by the controller at least one formula based on the received operational data;
determining by the controller at least one site level parameter using the at least one selected formula; and,
storing at the server sub-system at least one of operational data, the at least one selected formula, and the determined parameter via the server sub-system.

16. A method in accordance with claim 15, said method further comprising outputting one or more of the operational data, the at least one selected formula, and the determined parameter to a user via a user interface device communicatively coupled to the controller.

17. A method in accordance with claim 16, wherein outputting via the user interface device further comprising outputting to the user via at least one of a visual display, a graphical user interface, a hardcopy device, and an audio device.

18. A method in accordance with claim 15, said selecting at least one formula further comprising automatically selecting at least one formula based on at least one of the received operational data and historical data.

19. A method in accordance with claim 15, wherein selecting a formula comprises selecting a formula via a database server configured to store and retrieve one or more of historical data corresponding to the at least one operating wind turbine, the operational data, and the at least one formula.

20. A method in accordance with claim 19, said selecting at least one formula further comprising selecting at least one formula based on the historical data.

* * * * *